US010480373B2

(12) United States Patent
Haas

(10) Patent No.: US 10,480,373 B2
(45) Date of Patent: Nov. 19, 2019

(54) TECHNIQUES FOR CONTROL OF AN SCR AFTERTREATMENT SYSTEM IN RESPONSE TO AN AMMONIA SLIP CONDITION

(71) Applicant: Cummins Inc., Columbus, IN (US)

(72) Inventor: Michael Haas, Columbus, IN (US)

(73) Assignee: Cummins Inc., Columbus, IN (US)

( * ) Notice: Subject to any disclaimer, the term of this patent is extended or adjusted under 35 U.S.C. 154(b) by 432 days.

(21) Appl. No.: 15/187,061

(22) Filed: Jun. 20, 2016

(65) Prior Publication Data

US 2016/0290201 A1 Oct. 6, 2016

Related U.S. Application Data

(63) Continuation of application No. PCT/US2014/012195, filed on Jan. 20, 2014.

(51) Int. Cl.
*F01N 11/00* (2006.01)
*F01N 3/20* (2006.01)
*F01N 3/021* (2006.01)

(52) U.S. Cl.
CPC ............ *F01N 3/208* (2013.01); *F01N 3/021* (2013.01); *F01N 11/00* (2013.01); *F01N 2560/026* (2013.01); *F01N 2610/02* (2013.01); *F01N 2900/1402* (2013.01); *F01N 2900/1616* (2013.01); *F01N 2900/1621* (2013.01); *F01N 2900/1812* (2013.01); *Y02T 10/24* (2013.01)

(58) Field of Classification Search
CPC .......... F01N 11/00; F01N 3/021; F01N 3/208; F01N 2560/026; F01N 2610/02; F01N 2900/1402; F01N 2900/1616; F01N 2900/1621; F01N 2900/1812
See application file for complete search history.

(56) References Cited

U.S. PATENT DOCUMENTS

| | | | |
|---|---|---|---|
| 6,442,932 B1 * | 9/2002 | Hofmann | B01D 53/9431 60/274 |
| 8,034,291 B2 | 10/2011 | Qi et al. | |
| 3,091,343 A1 | 1/2012 | Ichikawa | |
| 8,109,070 B1 | 2/2012 | Wills et al. | |
| 8,181,460 B2 | 5/2012 | Garimella et al. | |
| 8,225,595 B2 | 7/2012 | Garimella et al. | |
| 8,733,083 B2 | 5/2014 | Ofoli et al. | |
| 2006/0153761 A1 * | 7/2006 | Bandl-Konrad | B01D 53/9431 423/239.1 |
| 2009/0185954 A1 | 7/2009 | Qi et al. | |

(Continued)

OTHER PUBLICATIONS

International Search Report and Written Opinion, US/ISA, PCT Application No. PCT/US2014/012195, dated May 9, 2014, 9 pgs.

*Primary Examiner* — Jason D Shanske
*Assistant Examiner* — Matthew T Largi
(74) *Attorney, Agent, or Firm* — Taft Stettinius & Hollister LLP

(57) ABSTRACT

An exhaust aftertreatment system includes a selective catalytic reduction (SCR) catalyst is disposed in an exhaust gas system of an internal combustion engine. A reductant injector is coupled to the exhaust gas stream at a position upstream of the SCR catalyst. A controller is configured to determine an NH3 slip condition and control operation of the exhaust aftertreatment system in response to the NH3 slip condition to improve deNOx efficiency and reduce NH3 slip.

22 Claims, 3 Drawing Sheets

(56) References Cited

U.S. PATENT DOCUMENTS

| | | |
|---|---|---|
| 2010/0024393 A1 | 2/2010 | Chi et al. |
| 2011/0219747 A1* | 9/2011 | Geveci .................... F01N 3/208 60/274 |
| 2012/0085082 A1 | 4/2012 | Levijoki et al. |
| 2014/0199219 A1* | 7/2014 | Christner ................ F01N 3/208 423/212 |

* cited by examiner

TECHNIQUES FOR CONTROL OF AN SCR AFTERTREATMENT SYSTEM IN RESPONSE TO AN AMMONIA SLIP CONDITION

BACKGROUND

The technical field of the present disclosure generally relates to control of selective catalytic reduction (SCR) aftertreatment systems for internal combustion engines.

SCR systems present several control challenges for internal combustion engine applications, including for mobile applications. SCR systems include a reduction catalyst and a reductant, such as urea or ammonia. An injector provides the reductant to the exhaust stream at a position upstream of the reduction catalyst, and the reductant enters the gas phase of the exhaust stream as ammonia. A delay sometimes occurs between the introduction of the reductant and the availability of the reductant product, for example injected particles of the reductant may need to evaporate into the exhaust stream, hydrolyze from urea to ammonia, and/or thoroughly mix into the exhaust stream for general availability across the reduction catalyst. Additionally, the reductant catalyst may include some ammonia storage capacity. Storage capacity can complicate the controls process, for example, by creating additional controls targets (e.g. a storage target), by releasing ammonia unexpectedly (e.g. when a system condition causes a decrease in storage capacity), and/or by adsorbing some of the injected ammonia in an early part of the catalyst thereby reducing the availability of ammonia at a rear portion of the catalyst during catalyst filling operating periods.

The challenges presented by presently available SCR systems are exacerbated by the transient nature of mobile applications. The engine load and speed profile varies during operations in a manner that is determined by an operator and generally not known in advance to the SCR control system. Additionally, available feedback control systems suffer from several drawbacks. For example, the concentration of ammonia is difficult to determine in real time. Commercially reasonable NOx sensors can suffer from cross-sensitivity with ammonia, complicating the determination of the amount of NOx present in the exhaust gas outlet from the SCR catalyst. The addition of an NH3 sensor to the control system can improve control capabilities, but adds cost to the system.

Ammonia is generally an undesirable constituent of the final exhaust emissions, and ammonia that is emitted from, or "slips" from, the catalyst represents ineffectively utilized reductant that increases operating costs. Also, in systems that utilize an ammonia oxidation (AMOX) catalyst downstream of the SCR catalyst, ammonia slip can be converted to NOx in certain conditions. Therefore it is desirable to operate at a very low or zero ammonia concentration at the outlet of SCR catalyst. However, NOx sensors that are cross-sensitive to ammonia, and the conversion of NH3 slip to NOx in systems that employ an AMOX catalyst, hinder the ability to provide a reliable estimate of the occurrence and/or amount of ammonia slip. This reduces the effectiveness of feedback SCR control in providing an optimal amount of ammonia to the exhaust system and potentially creates false indications of an SCR and/or reductant injector fault conditions. As a result, further contributions in SCR control in response to ammonia slip conditions are needed.

SUMMARY

One embodiment is a unique method for controlling an SCR aftertreatment system in response to detection of an NH3 slip condition by manipulating a target deNOx efficiency of the SCR catalyst. The SCR aftertreatment system is operated to achieve the target deNOx efficiency by the SCR catalyst. When an NH3 slip condition is detected at a current deNOx efficiency, a modified deNOx efficiency target is set that is reduced relative to the deNOx efficiency target, and is a function of the current deNOx efficiency. The modified deNOx efficiency target results in a reduced amount of reductant supplied to the exhaust system. The modified deNOx efficiency target is increased over time until one or more NH3 slip correction conditions is satisfied.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
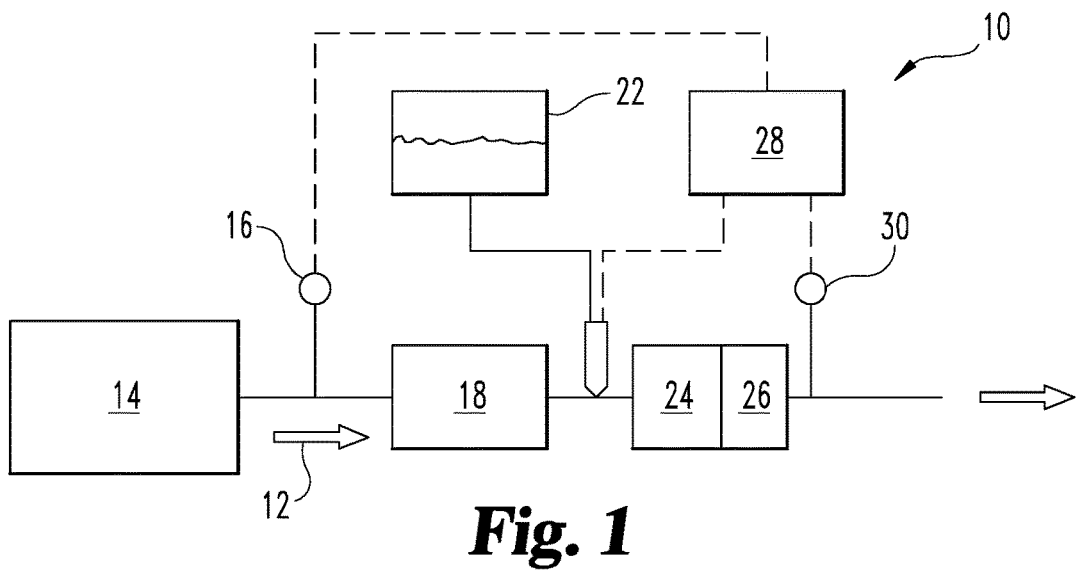
FIG. 1 is a schematic diagram of a system including an SCR catalyst to reduce $NO_x$ emissions in an exhaust gas flow produced by an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an internal combustion engine system 10 includes an exhaust gas flow 12 produced by operation of an internal combustion engine 14, the exhaust gas flow 12 including an amount of $NO_x$. Engine 14 includes a number of cylinders (not shown) that receive fueling from a fuel source (not shown). Any number of cylinders and any cylinder arrangement, such as an in-line or V-shaped arrangement, are contemplated. Combustion of the fuel in cylinders produces the exhaust flow 12, a portion of which may be recirculated to an intake system (not shown) via an exhaust gas recirculation (EGR) system. Embodiments without an EGR system are also contemplated.

The system 10 includes a first $NO_x$ sensor 16 to provide an output indicative of a measurement of an engine-out $NO_x$ amount upstream of an SCR catalyst 24. The engine-out $NO_x$ amount may alternatively be determined virtually by a model in response to engine and exhaust operating parameters, or a sensor or sensors positioned at a different location in the system 10. As used herein, NOx sensor 16 refers either to an actual physical NOx sensor or a virtual NOx sensor, or both.

The system 10 includes an upstream aftertreatment component 18, that may be an oxidation catalyst, a particulate filter, or both. In certain embodiments, the system 10 does not include any oxidation catalyst and/or particulate filter. The system 10 also includes a reductant injector 20 fluidly coupled to a reductant source 22. The reductant injector 20 injects reductant, such as urea, $NH_3$, or other $NH_3$ producing constituent, into exhaust gas flow 12. The system 10 includes SCR catalyst 24 downstream of reductant injector 20 to receive the injected reductant with the exhaust gas flow, and a second NOx sensor 30 downstream of SCR catalyst 24. In one embodiment, NOx sensor 30 is a physical NOx sensor that is cross-sensitive to ammonia. In another embodiment, NOx sensor 30 is a virtual NOx sensor, a NOx sensor that is not cross-sensitive to ammonia, an ammonia sensor, a virtual ammonia sensor, or any combination thereof.

The system 10 may include an optional NH3 oxidation (AMOX) catalyst 26, provided to oxidize at least a portion of the slipping NH3 from the SCR catalyst 24 during at least some operating conditions. The AMOX catalyst 26 may be present as a discrete catalytic element, in the same or a different housing from the SCR catalyst 24, and may be included as a washcoat on a portion (specifically a rear portion) of the SCR catalyst 24. The SCR catalyst 24 may include one or more catalyst elements located in the same or a different housing. Additional SCR catalyst elements may be present, and are schematically included with the SCR catalyst 24 herein. In addition, certain embodiments contemplate that the AMOX catalyst 26 can be completely removed from system 10 in view of the systems and techniques disclosed herein to mitigate or eliminate NH3 slip. NOx sensor 30 can be located at the outlet of SCR catalyst 24, between the outlet of SCR catalyst 24 and an inlet to AMOX catalyst 26 when an AMOX catalyst is provided, or at the outlet of AMOX catalyst 26 when an AMOX catalyst is provided.

The system 10 further includes a controller 28. The controller 28 may form a portion of a processing subsystem, and may include functional elements in software and/or hardware. The controller 28 may be a single device or more than one distributed devices. The controller 28 may have modules structured to functionally execute any operations of any method or procedure described herein. In the illustrated embodiment, controller 28 is connected directly or indirectly to reductant injector to provide a reductant injection amount into the exhaust flowpath. Controller 28 is also connected to NOx sensors 16, 30 to receive sensor output signals or, in the case of a virtual sensor, outputs of one or more signals indicative of, a NOx amount and/or the presence NOx and/or NH3 in the exhaust gas flow.

An exemplary method in which controller 28 can be configured for execution of control algorithms includes providing a SCR catalyst disposed in an exhaust gas flow produce by internal combustion engine 14, and a reductant injector 20 operationally coupled to the exhaust gas flow at a position upstream of the SCR catalyst 24. The method includes providing a first $NO_x$ sensor 16 that is a virtual sensor or coupled to the exhaust gas flow at a position upstream of the SCR catalyst 24 and a second NOx sensor 30 coupled to the exhaust gas flow downstream of the SCR catalyst 24.

The method may further include establishing a deNOx efficiency target, determining a current deNOx efficiency of the SCR catalyst 24, determining a NH3 slip condition in which ammonia slip past SCR catalyst 24 is occurring at the current deNOx efficiency, determining a temporary deNOx efficiency target in response to the NH3 slip condition as a function of the current deNOx efficiency, determining an NH3 amount for injection into the exhaust gas flow in response to the temporary deNOx efficiency target, and injecting reductant in response to the NH3 amount until a deNOx efficiency adjustment condition is satisfied.

Figure 2:
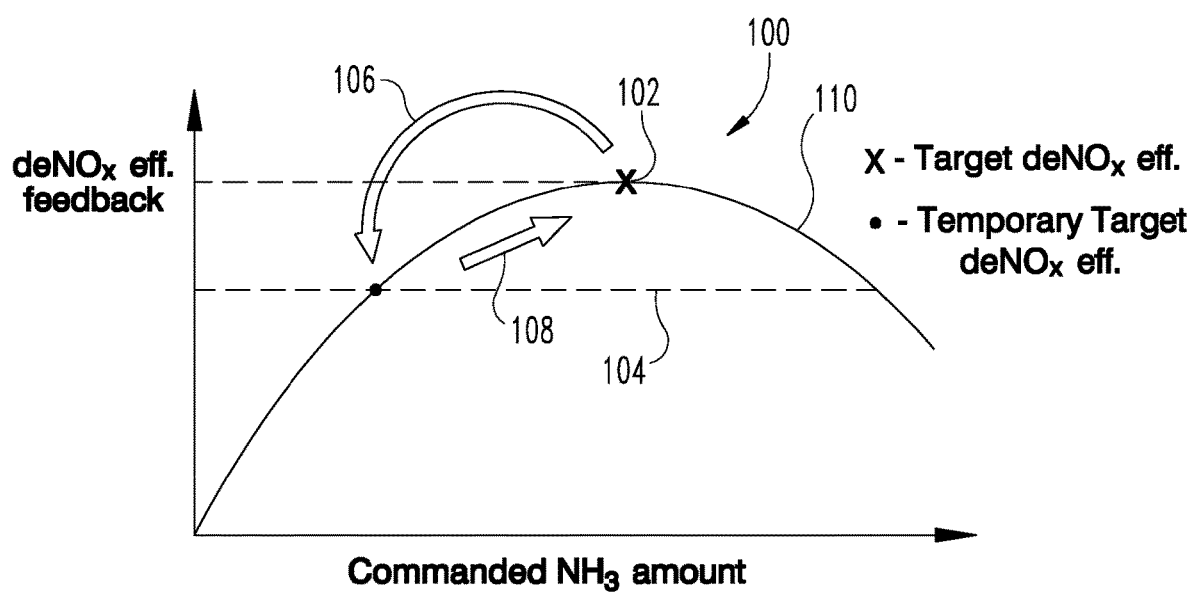
FIG. 2 is a graphical illustration of a procedure for controlling the SCR aftertreatment system in response to an NH3 slip condition.

Referring to FIG. 2, a graphical representation of one embodiment of an NH3 slip correction algorithm 100 is shown. The graphical representation includes a commanded NH3 amount along its horizontal axis and a deNOx efficiency feedback amount along its vertical axis. A deNOx efficiency curve 110 is shown that represents the deNOx efficiency at various commanded NH3 amounts. In one embodiment, the commanded NH3 amount is an ammonia to NOx ratio (ANR) that includes an amount of NH3 commanded by controller 28. In feedforward control, a commanded NH3 amount is determined that achieves a target deNOx efficiency 102. Feedback control using, for example, NOx amounts from NOx sensors 16, 30 then determines the deviation of the current deNOx efficiency from the target deNOx efficiency and adjusts the feedforward NH3 amount to achieve the target deNOx efficiency 102 at various levels of engine-out NOx amounts that occur over time.

However, under certain operating conditions, deNOx efficiency target 102 is not achievable by feedback control based on the NOx efficiency feedback due to, for example, NH3 slip conditions and/or NOx make by an AMOX catalyst is one is provided. When the target deNOx amount 102 cannot be achieved, the commanded NH3 amount must either be increased or decreased to achieve the target deNOx efficiency 102. Since the deNOx efficiency feedback determination is influenced by the cross-sensitivity of NOx sensor 30 and by NOx production of any AMOX catalyst 26, deNOx efficiency feedback control cannot be reliably employed to determine the commanded NH3 amount under NH3 slip conditions.

Controller 28 is configured to determine the target deNOx efficiency 102 for SCR catalyst 24 and also is configured to determine a current deNOx efficiency 104 for SCR catalyst 24. The target deNOx efficiency 102 is determined by controller 28 in response to one or more output signals indicative of one or more operating conditions of engine 14 and the aftertreatment system. Target deNOx efficiency 102 can be a static amount, or vary in response to operating conditions. Any suitable technique for determining the current deNOx efficiency 104 is contemplated. For example, $$\text{current } \eta_{SCR} = (C_{NOx,in} - C_{NOx,out})/C_{NOx,in} \quad \text{Equation 1}$$

where $C_{NOx,in}$ is the NOx amount upstream of the inlet of SCR catalyst 24 as measured by the actual or virtual output of the first NOx sensor 16, and $C_{NOx,out}$ is the NOx amount downstream of SCR catalyst 24 as measured by the output of second NOx sensor 30. In addition, the current $\eta_{SCR}$ is the deNOx efficiency of SCR catalyst 24 in removing NOx as determined by the outputs of first and second NOx sensors 16 and 30. For example, in Equation 1, current $\eta_{SCR}$ is 0.7 if SCR catalyst removes 70% of the engine out NOx.

The NOx amount indicated by NOx sensor 30, under NH3 slip conditions, is over-representative of the actual NOx amount at the outlet from SCR catalyst 24 due to, for example, the cross-sensitivity of NOx sensor 30 to NH3 and/or the conversion of NH3 to NOx by AMOX catalyst 26 when an AMOX catalyst is provided. Therefore, controller 28 is not able to determine from deNOx efficiency curve 110 whether the commanded NH3 amount that provides current deNOx efficiency 104 should be increased or decreased to achieve the target deNOx efficiency 102.

The algorithm 100 includes determining a temporary target deNOx efficiency 106 in response to the current deNOx efficiency 104 deviating from the target deNOx efficiency 102 by more than a threshold amount and/or for a threshold amount of time. The threshold deviation can be established as a predetermined static amount or a variable amount in response to engine operating conditions. Since current deNOx efficiency 104 is less than the target deNOx efficiency 102, temporary target deNOx efficiency 106 can be established as a function of current deNOx efficiency 104. The corresponding temporary commanded NH3 amount is selected that is less than the commanded NH3 amount of target deNOx efficiency 102, resulting a reduced NH3 amount being provided to the exhaust gas flow from injector 20. In addition, feedback control of the commanded NH3 amount in response to the current deNOx efficiency and target deNOx efficiency is suspended.

The temporary target deNOx efficiency 106 is then increased over time, as indicated by adjustment curve 108, toward the target deNOx efficiency amount 102. The increase in the temporary target deNOx efficiency 106 can occur incrementally in any suitable manner until one or more deNOx efficiency adjustment conditions is satisfied. The deNOx efficiency adjustment conditions can include, for example, detection that NH3 slip is no longer occurring, the temporary target deNOx efficiency 106 increases above a static or dynamic threshold amount, the temporary target deNOx efficiency 106 reaches the target deNOx efficiency 102, a time limit expires, or a combination of two or more of these conditions.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 3:
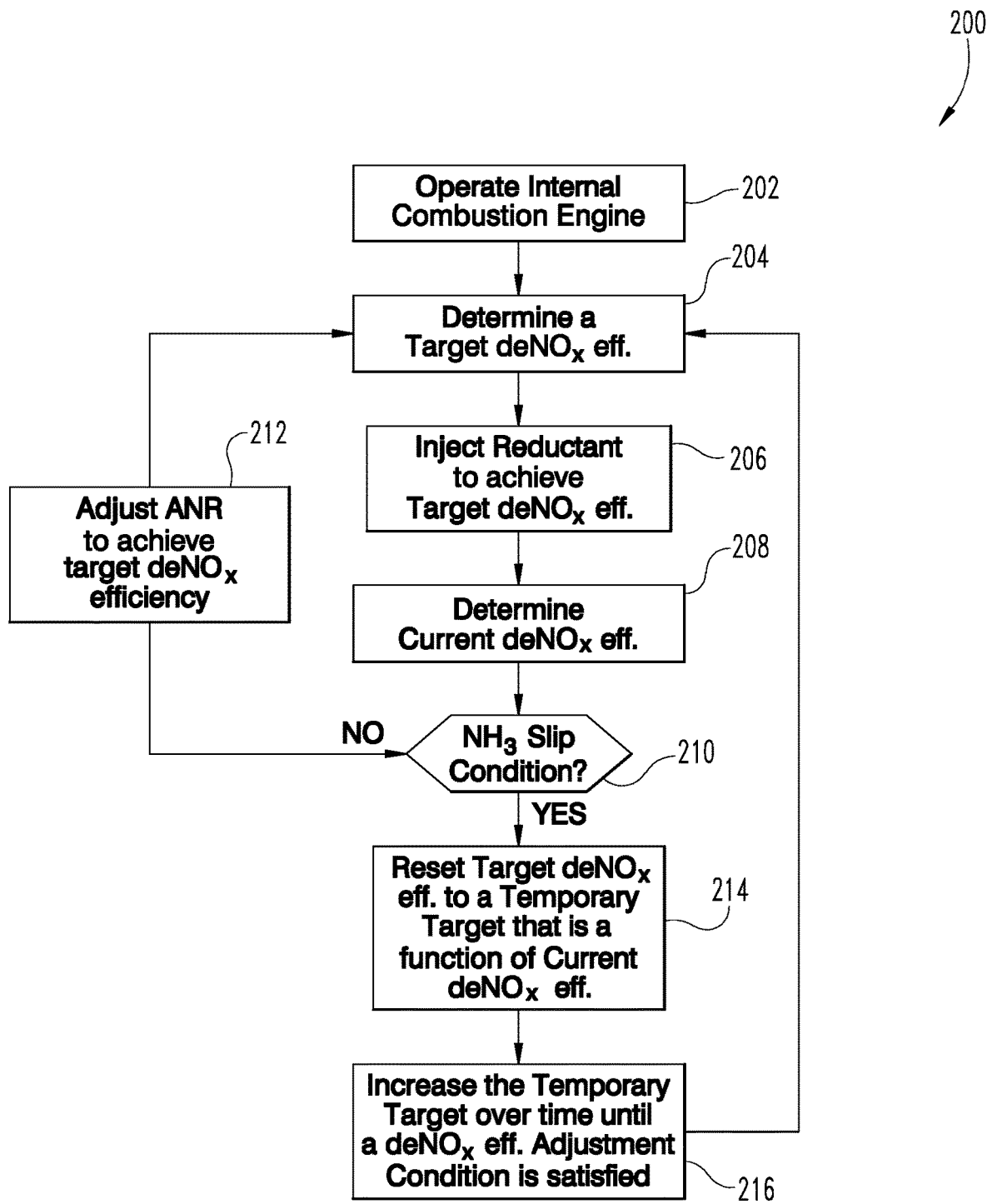
FIG. 3 is a flow diagram of a procedure for controlling the SCR aftertreatment system in response to an NH3 slip condition.
Figure 4:
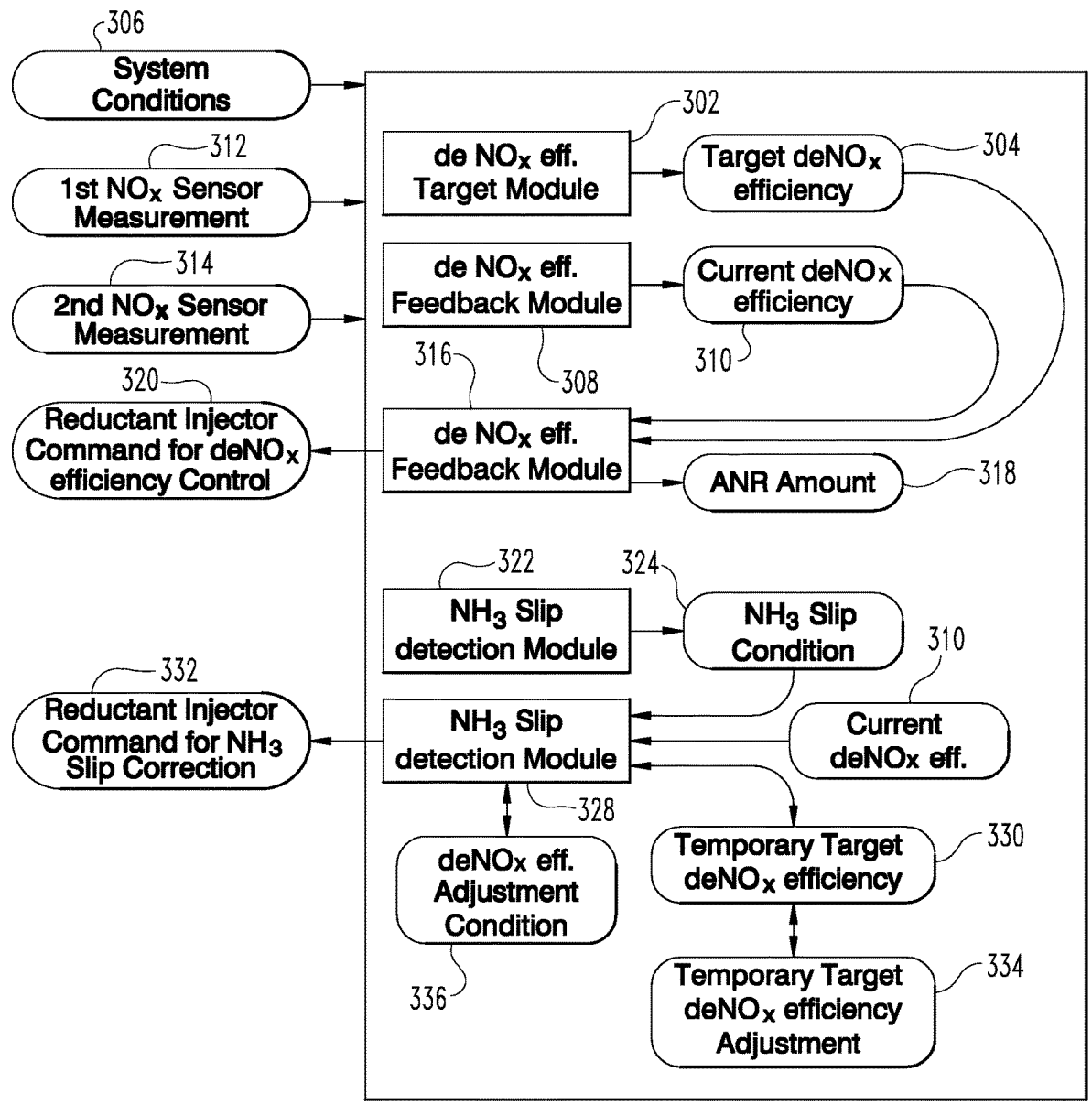
FIG. 4 is a schematic diagram of one embodiment of a controller apparatus operable to control the SCR aftertreatment system in response to an NH3 slip condition of the system of FIG. 1.

Referring to FIG. 3, an exemplary procedure 200 includes providing the SCR catalyst 24 disposed in an exhaust gas system of an internal combustion engine 14, and a reductant injector 20 operationally coupled to the exhaust gas system at a position upstream of the SCR catalyst 24. The procedure 200 further includes providing a first NOx sensor 16 upstream of the SCR catalyst 14 and a second NOx sensor 30 coupled to the exhaust system at a position downstream of the SCR catalyst 24. The procedure 200 includes an operation 202 to operate the internal combustion engine 14 to produce an exhaust gas flow.

During operation of internal combustion engine 14, procedure 200 includes an operation 204 to determine a target deNOx efficiency for SCR catalyst 24 in removing NOx from the exhaust gas flow 12. Procedure 200 further includes an operation 206 to inject reductant into the exhaust gas flow 12 by providing a reductant injection command to reductant injector 20 that provides a commanded NH3 amount to the exhaust gas flow upstream of the SCR catalyst 24 in response to the target deNOx efficiency.

An operation 208 determines the current deNOx efficiency of SCR catalyst 24. The current deNOx efficiency can be used, for example, in providing feedback control of the commanded NH3 amount to achieve the target deNOx efficiency. Procedure 200 further includes a conditional 210 to determine if an NH3 slip condition is present. The NH3 slip condition can be determined by any suitable technique and/or device, including the use of an NH3 sensor downstream of SCR catalyst 24 and/or and NH3 slip detection algorithm programmed in controller 28. In one embodiment of the present disclosure, an NH3 sensor downstream of SCR catalyst is not required or involved in NH3 slip detection, and an NH3 slip condition is determined from the output of one or more of the NOx sensor 16, 30. Non-limiting example NH3 slip detection techniques are disclosed in Provisional Application Ser. No. 61/917,490 filed on Dec. 18, 2013, which is incorporated herein by reference for all purposes.

If conditional 210 is negative, procedure 200 continues at operation 212 to adjust the ANR to provide a commanded NH3 amount that achieves the target deNOx efficiency. Operation 212 can include providing feedback control in response to a deviation of the current deNOx efficiency from a target deNOx efficiency, and determining the ANR in response to the deviation and one or more other operating conditions of engine 14 and the aftertreatment system. Procedure 200 then continues at operation 204 while the internal combustion engine is operated.

If conditional 210 is positive, procedure 200 continues at operation 214 to reset the target deNOx efficiency to a temporary target deNOx efficiency that is a function of the current deNOx efficiency. In one embodiment, the temporary target deNOx efficiency is set to the current deNOx efficiency. The commanded NH3 amount is then adjusted in response to the temporary target deNOx efficiency while feedback control of the NH3 amount is suspended. Procedure 200 continues at operation 216 to increase the temporary target deNOx efficiency over time until one or more of a deNOx efficiency adjustment condition is satisfied. The deNOx efficiency adjustment conditions can include, for example, detection that NH3 slip is no longer occurring, the temporary target deNOx efficiency 106 increases above a static or dynamic threshold amount, the temporary target deNOx efficiency reaches the target deNOx efficiency, a time limit expires, or a combination of two or more of these conditions.

An example system includes a processing subsystem having controller 28 structured to functionally execute certain operations to control an SCR aftertreatment system. In certain embodiments, the controller 28 includes one or more modules structured to functionally execute the operations of the controller 28. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or via computer readable medium, and modules may be distributed across various hardware components.

The controller 28 may be a part of a system 300 including an SCR portion and first and second NOx sensors 16, 30 operationally or virtually coupled to an internal combustion engine exhaust gas flow at respective upstream and downstream positions of the SCR portion. The SCR portion includes any fraction of an SCR catalyst amount in the system, including the full SCR catalyst amount. The NOx sensors provide an output indicative of a NOx measurement, which may be an output value of the NOx sensor, a measurement of NOx in the exhaust stream, and/or an apparent measurement of NOx, for example combined with any apparent NOx due to cross-sensitivity to and the presence of ammonia in the exhaust stream at the NOx sensor.

Controller 28 include a deNOx efficiency target module 302 that is configured to determine a target deNOx efficiency 304 in response to, for example, system conditions 306. The target deNOx efficiency 302 can be a static value or a dynamic value that varies in response to system conditions 306. System conditions 306 can include, for example, an engine speed, a temperature of one or components of the exhaust system, an ammonia storage capacity of SCR catalyst 24, an exhaust flow rate, or any other condition that may be considered in determining a target deNOx efficiency.

Controller 28 also includes a deNOx efficiency feedback module 308 that determines a current deNOx efficiency 310 in response to, for example, a first NOx sensor measurement 312 and a second NOx sensor measurement 314. Controller 28 further includes a deNOx efficiency tracking module 316 that receives target deNOx efficiency 304 and current deNOx efficiency 310 to determine a commanded NH3 amount, such as ANR amount 318, to achieve the target deNOx efficiency 304 via closed loop or open loop control of the ANR amount 318. The deNOx efficiency tracking module 316 may further determine a reductant injector command 320 that provides the commanded NH3 amount to the exhaust gas flow for deNOx efficiency control to achieve the target deNOx efficiency 304.

The controller 28 further includes an NH3 slip detection module 322 that receives system conditions 306 and determines an NH3 slip condition 324 at the outlet of SCR catalyst 24, at the inlet of AMOX catalyst 26, at the tailpipe, and/or NOx make by an AMOX catalyst 26. In response the NH3 slip condition 326, one of NH3 slip detection module 322 or an NH3 correction module 328 suspends feedback control in achieving the deNOx efficiency target by deNOx efficiency tracking module 316.

In response to the NH3 slip condition, NH3 correction module 328 determines a temporary target deNOx efficiency 330 that is a function of the current deNOx efficiency 310, and outputs a reductant injection command 332 for NH3 slip correction. Reductant injection command 332 provides a commanded NH3 amount corresponding to the temporary deNOx efficiency target 330. NH3 correction module 328 further determines a temporary target deNOx efficiency adjustment 334 that increases the temporary target deNOx efficiency 330 toward the target deNOx efficiency 304 in any one of a stepwise, incremental, continuous, linear, or functional manner. During the operation of NH3 correction module 328, deNOx efficiency adjustment conditions 336 are monitored. When one or more of the deNOx efficiency adjustment conditions 336 is satisfied, deNOx efficiency tracking module 316 resumes control of determination of the reductant injection amount as discussed above. As also discussed above, the deNOx efficiency adjustment conditions 336 may include any one or more of a static or dynamic threshold amount of increase in the temporary target deNOx efficiency, the temporary target deNOx efficiency reaches the target deNOx efficiency, a time limit expires, or other condition indicating that adjustment of the temporary deNOx efficiency should be terminated.

The system further includes reductant injector 20 responsive to the reductant injection commands 320, 332 output by controller 28. The reductant injector response to the reductant injection commands may be any type of response understood in the art. Example and non-limiting responses of the reductant injector to the reductant injector commands 320, 332 include targeting the reductant injection amount as an injection amount, progressing toward injecting the reductant injection amount (e.g. through a feedforward and/or feedback controller), and/or providing the reductant injection amount into a controller accepting other competing or limiting values for injection (e.g. ammonia slip limits, SCR catalyst storage limits, current conversion efficiency limits, etc.).

According to one aspect, a method includes operating an internal combustion engine to produce an exhaust gas flow into an exhaust system including a selective catalytic reduction (SCR) catalyst disposed in the exhaust gas flow. The exhaust system includes a reductant injector coupled to the exhaust system at a position upstream of the SCR catalyst, a first NOx sensor upstream of the SCR catalyst, and a second NOx sensor coupled to the exhaust system at a position downstream of the SCR catalyst. The method further includes determining a target deNOx efficiency for the SCR catalyst; injecting an amount of reductant into the exhaust gas flow in response to the target deNOx efficiency; determining a current deNOx efficiency of the SCR catalyst in removing NOx from the exhaust gas flow as a function of a first output from the first NOx sensor and a second output from the second NOx sensor, where the current deNOx efficiency is less than the target deNOx efficiency; detecting an NH3 slip condition; in response to detecting the NH3 slip condition, determining a temporary target deNOx efficiency for the SCR catalyst as a function of the current deNOx efficiency; and injecting an amount of the reductant in response to the temporary target deNOx efficiency until at least one deNOx efficiency adjustment condition is satisfied.

In one embodiment, the amount of reductant is determined by an ammonia to NOx ratio upstream of the SCR catalyst that achieves the temporary target deNOx efficiency. In another embodiment, the current deNOx efficiency of the SCR catalyst is determined by current $\eta_{SCR}=(C_{NOx,in}-CN_{NOx,out})/C_{NOx,in}$; where current nscR is the current deNOx efficiency of the SCR catalyst, $C_{NOx,in}$ is the NOx measurement indicated by the first NOx sensor, and $C_{NOx,out}$ is the NOx measurement indicated by the second NOx sensor. In yet another embodiment, detecting the NH3 slip condition includes determining an NH3 presence in the exhaust gas flow downstream of the SCR catalyst. In another embodiment, the exhaust system includes an ammonia oxidation catalyst downstream of the SCR catalyst, and detecting the NH3 slip condition include determining NOx make from the AMOX catalyst.

In another embodiment, the method includes adjusting the temporary target deNOx efficiency toward the target deNOx efficiency until the at least one deNOx efficiency adjustment condition is satisfied. In a refinement of this embodiment, the at least one deNOx efficiency adjustment includes at least one of: the NH3 slip condition is no longer present; an elapse of a time period since detecting the NH3 slip condition; a threshold increase in the temporary target deNOx efficiency; and the temporary target deNOx efficiency is the same as the target deNOx efficiency.

In another embodiment, determining the temporary target deNOx efficiency for the SCR catalyst includes setting the temporary target deNOx efficiency equal to the current deNOx efficiency. In yet another embodiment, the first NOx sensor is a virtual NOx sensor.

In another aspect, a system is disclosed that includes an internal combustion engine operable to produce an exhaust gas flow into an exhaust system. The exhaust system includes a SCR catalyst disposed in the exhaust gas flow, a reductant injector operationally coupled to the exhaust gas flow at a position upstream of the SCR catalyst, a first NOx sensor upstream of the SCR catalyst, and a second NOx sensor coupled to the exhaust system at a position downstream of the SCR catalyst. The system also includes a controller connected to the first NOx sensor, the second NOx sensor and the internal combustion engine. The controller is configured to determine a target deNOx efficiency in response to one or more operating conditions of the system and a current deNOx efficiency from a first output of the first NOx sensor and a second output of the second NOx sensor and a reductant injector command that provides a feedback controlled NH3 amount in response at least in part to a deviation of the current deNOx efficiency from the target deNOx efficiency. The controller is further configured, in response to detection of an NH3 slip condition, to determine a temporary target deNOx efficiency as a function of the current deNOx efficiency and a modified reductant injection command to provide a reduced NH3 amount in response to the temporary target deNOx efficiency.

In one embodiment, the controller is configured to determine the feedback controlled NH3 amount and the reduced NH3 amount as a function of an ammonia to NOx ratio upstream of the SCR catalyst. In another embodiment, the controller is configured to detect the NH3 slip condition in response to an NH3 presence in the exhaust gas flow downstream of the SCR catalyst. In yet another embodiment, the temporary target deNOx efficiency for the SCR catalyst is set to the current deNOx efficiency.

In another embodiment, the system includes at least one of an oxidation catalyst and a particulate filter upstream of the SCR catalyst and an ammonia oxidation catalyst downstream of the SCR catalyst. In a further embodiment, the controller is configured to, in response to detection of an NH3 slip condition, suspend providing the feedback controlled NH3 amount via the reductant injector command until a deNOx efficiency adjustment condition is satisfied. In a refinement of this embodiment, the deNOx efficiency adjustment condition includes at least one of: the NH3 slip condition being no longer present; an elapse of a time period since detection of the NH3 slip condition; a threshold increase in the temporary target deNOx efficiency; and the temporary target deNOx efficiency being the same as the target deNOx efficiency.

According to another aspect, an apparatus includes a controller connected to a first NOx sensor upstream of a SCR catalyst in an exhaust system and a second NOx sensor downstream of the SCR catalyst. The exhaust system receives an exhaust gas flow produced by operation of an internal combustion engine. The controller includes a deNOx efficiency target module configured to determine a target deNOx efficiency for injection of an NH3 amount to achieve the target deNOx efficiency. The controller also includes a deNOx efficiency feedback module configured to determine a current deNOx efficiency in response to NOx amounts from the first NOx sensor and the second NOx sensor, and an NH3 slip detection module configured to detect an NH3 slip condition. In response to the NH3 slip condition, the controller suspends injection of the NH3 amount for achieving the target deNOx efficiency. The controller further includes an NH3 correction module configured to determine a temporary target deNOx efficiency in response to the NH3 slip condition for injection of a reduced NH3 amount, where the temporary target deNOx efficiency is a function of the current deNOx efficiency.

In one embodiment, the NH3 correction module is configured to determine a reductant injector command in response to the temporary target deNOx efficiency, the reductant injector command providing the reduced NH3 amount that is less than the NH3 amount provided in response to the target deNOx efficiency. In another embodiment, the controller includes a deNOx efficiency tracking module that is configured to determine a reductant injector command in response to a deviation of the current deNOx efficiency from the target deNOx efficiency. In yet another embodiment, the controller is configured to suspend injection of the NH3 amount to achieve the target deNOx efficiency until a deNOx efficiency adjustment condition is satisfied. The deNOx efficiency adjustment condition includes at least one of the NH3 slip condition no longer being present; an elapse of a time period since detection of the NH3 slip condition; a threshold increase in the temporary target deNOx efficiency; and the temporary target deNOx efficiency being the same as the target deNOx efficiency.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
operating an internal combustion engine to produce an exhaust gas flow into an exhaust system including a selective catalytic reduction (SCR) catalyst disposed in the exhaust gas flow, the exhaust system including:
a reductant injector coupled to the exhaust system at a position upstream of the SCR catalyst;
a first NOx sensor upstream of the SCR catalyst;
a second NOx sensor downstream of the SCR catalyst;
determining a target deNOx efficiency for the SCR catalyst;
injecting a first amount of reductant into the exhaust gas flow in response to the target deNOx efficiency;
determining a current deNOx efficiency of the SCR catalyst in removing NOx from the exhaust gas flow as a function of a first output from the first NOx sensor and a second output from the second NOx sensor;
determining the current deNOx efficiency is less than the target deNOx efficiency;
detecting an NH3 slip condition;
in response to detecting the NH3 slip condition, determining a temporary target deNOx efficiency for the SCR catalyst; and
injecting a second amount of the reductant in response to the temporary target deNOx efficiency while increasing the temporary target deNOx efficiency toward the target deNOx efficiency until at least one deNOx efficiency adjustment condition is satisfied, wherein the second amount of reductant is less than the first amount of reductant.

2. The method of claim 1, wherein the second amount of reductant is determined by an ammonia to NOx ratio upstream of the SCR catalyst that achieves the temporary target deNOx efficiency.

3. The method of claim 1, wherein the current deNOx efficiency of the SCR catalyst is determined by:

current $\eta_{SCR}=(C_{NOx,in}-C_{NOx,out})/C_{NOx,in}$;

wherein current $\eta_{SCR}$ is the current deNOx efficiency of the SCR catalyst, $C_{Nox,in}$ is the NOx measurement indicated by the first NOx sensor, and $C_{NOx,out}$ is the NOx measurement indicated by the second NOx sensor.

4. The method of claim 1, wherein detecting the NH3 slip condition includes determining an NH3 presence in the exhaust gas flow downstream of the SCR catalyst.

5. The method of claim 1, wherein the exhaust system includes an ammonia oxidation catalyst downstream of the SCR catalyst, and detecting the NH3 slip condition includes determining the AMOX catalyst is converting NH3 to NOx.

6. The method of claim 1, wherein the temporary target deNOx efficiency is determined as a function of the current deNOx efficiency.

7. The method of claim 6, wherein the at least one deNOx efficiency adjustment includes at least one of:
the NH3 slip condition is no longer present;
an elapse of a time period since detecting the NH3 slip condition;
a threshold increase in the temporary target deNOx efficiency; and
the temporary target deNOx efficiency is the same as the target deNOx efficiency.

8. The method of claim 1, wherein determining the temporary target deNOx efficiency for the SCR catalyst includes setting the temporary target deNOx efficiency equal to the current deNOx efficiency.

9. The method of claim 1, wherein the first NOx sensor is a virtual NOx sensor.

10. A system, comprising:
an internal combustion engine operable to produce an exhaust gas flow into an exhaust system, the exhaust system including:
a selective catalytic reduction (SCR) catalyst disposed in the exhaust gas flow;
a reductant injector operationally coupled to the exhaust gas flow at a position upstream of the SCR catalyst;
a first NOx sensor upstream of the SCR catalyst;
a second NOx sensor downstream of the SCR catalyst;
a controller connected to the first NOx sensor, the second NOx sensor and the internal combustion engine, the controller being configured to determine:
a target deNOx efficiency in response to one or more operating conditions of the system and a current deNOx efficiency from a first output of the first NOx sensor and a second output of the second NOx sensor;
a reductant injector command that provides a feedback controlled NH3 amount in response at least in part to a deviation of the current deNOx efficiency from the target deNOx efficiency;
the controller further being configured, in response to detection of an NH3 slip condition, to determine:
a temporary target deNOx efficiency; and
a modified reductant injection command to provide a reduced NH3 amount in response to the temporary target deNOx efficiency while increasing the temporary target deNOx efficiency toward the target deNOx efficiency.

11. The system of claim 10, wherein the controller is configured to determine the feedback controlled NH3 amount and the reduced NH3 amount as a function of an ammonia to NOx ratio upstream of the SCR catalyst.

12. The system of claim 10, wherein the controller is configured to detect the NH3 slip condition in response to an NH3 presence in the exhaust gas flow downstream of the SCR catalyst.

13. The system of claim 10, wherein the temporary target deNOx efficiency for the SCR catalyst is set to the current deNOx efficiency.

14. The system of claim 10, further comprising at least one of an oxidation catalyst upstream of the SCR catalyst, a particulate filter upstream of the SCR catalyst, and an ammonia oxidation catalyst downstream of the SCR catalyst.

15. The system of claim 10, wherein the controller is configured to, in response to detection of an NH3 slip condition, suspend providing the feedback controlled NH3 amount via the reductant injector command until a deNOx efficiency adjustment condition is satisfied.

16. The system of claim 15, wherein the deNOx efficiency adjustment condition includes at least one of:
the NH3 slip condition is no longer present;
an elapse of a time period since detection of the NH3 slip condition;
a threshold increase in the temporary target deNOx efficiency; and
the temporary target deNOx efficiency being the same as the target deNOx efficiency.

17. The system of claim 10, wherein the first NOx sensor is one of a physical constituent gas sensor and a virtual gas constituent sensor, and wherein the second NOx sensor is one of a physical constituent gas sensor and a virtual gas constituent sensor.

18. An apparatus, comprising:
a controller connected to a first NOx sensor upstream of a selective catalytic reduction (SCR) catalyst in an exhaust system and a second NOx sensor downstream of the SCR catalyst, wherein the exhaust system receives an exhaust gas flow produced by operation of an internal combustion engine, the controller including:
a deNOx efficiency target module configured to determine a target deNOx efficiency for injection of an NH3 amount to achieve the target deNOx efficiency;
a deNOx efficiency feedback module configured to determine a current deNOx efficiency in response to NOx amounts from the first NOx sensor and the second NOx sensor;
an NH3 slip detection module configured to detect an NH3 slip condition;
in response to the NH3 slip condition, the controller suspending injection of the NH3 amount for achieving the target deNOx efficiency; and
further comprising an NH3 correction module configured to determine a temporary target deNOx efficiency in response to the NH3 slip condition for injection of a reduced NH3 amount and to increase the temporary target deNOx efficiency toward the target deNOx efficiency during injection of the reduced NH3 amount.

19. The apparatus of claim 18, wherein the NH3 correction module is configured to determine the temporary target deNOx efficiency as a function of the current deNOx efficiency and a reductant injector command in response to the temporary target deNOx efficiency, the reductant injector command providing the reduced NH3 amount that is less than the NH3 amount provided in response to the target deNOx efficiency.

20. The apparatus of claim 18, further comprising a deNOx efficiency tracking module that is configured to determine a reductant injector command in response to a deviation of the current deNOx efficiency from the target deNOx efficiency.

21. The apparatus of claim 18, wherein the controller is configured to suspend injection of the NH3 amount to achieve the target deNOx efficiency until a deNOx efficiency adjustment condition is satisfied, the deNOx efficiency adjustment condition including at least one of the NH3 slip condition no longer being present; an elapse of a time period since detection of the NH3 slip condition; a threshold increase in the temporary target deNOx efficiency; and the temporary target deNOx efficiency being the same as the target deNOx efficiency.

22. The apparatus of claim 18, wherein the first NOx sensor is one of a physical constituent gas sensor and a virtual gas constituent sensor, and wherein the second NOx sensor is one of a physical constituent gas sensor and a virtual gas constituent sensor.

* * * * *